United States Patent [11] 3,632,964

[72] Inventor Martin H. Dapot
 Pawtucket, R.I.
[21] Appl. No. 322
[22] Filed Jan. 2, 1970
[45] Patented Jan. 4, 1972
[73] Assignee Texas Instruments Incorporated
 Dallas, Tex.

[54] APPARATUS FOR MAINTAINING THERMOCOUPLE REFERENCE JUNCTIONS AT A CONSTANT TEMPERATURE
 14 Claims, 5 Drawing Figs.

[52] U.S. Cl. .................................................... 219/209,
 219/200
[51] Int. Cl. ...................................................... H05b 1/00
[50] Field of Search ............................................. 219/209,
 210, 510, 469–471, 221, 228, 229, 243, 245;
 73/359, 341; 136/200

[56] References Cited
 UNITED STATES PATENTS

| | | | |
|---|---|---|---|
| 3,244,371 | 4/1966 | Bishop............................ | 219/210 X |
| 3,105,133 | 9/1963 | Norton............................ | 219/469 |
| 3,211,893 | 10/1965 | Barlow et al.................... | 219/469 |
| 3,280,626 | 10/1966 | Stempel.......................... | 73/341 X |
| 3,409,757 | 11/1968 | McVey............................ | 219/209 |
| 3,417,617 | 12/1968 | Rall................................. | 73/341 |

Primary Examiner—C. L. Albritton
Attorneys—Harold Levine, Edward J. Connors, Jr., John A. Haug, James P. McAndrews and Gerald B. Epstein ABSTRACT: Apparatus for providing a virtually constant temperature for a thermocouple reference junction employs a self-regulating double-oven assembly. A specific embodiment described includes an annular heating element composed of semiconductive material having a steeply sloped positive temperature coefficient of resistance above an anomaly point of approximately 95° C. and is seated in a first section of a cylindrical housing of thermally conductive material having a first diameter. An electrically insulating liner is placed in a second section of the housing having a second smaller diameter and extends through the bore of the annular heating element. A plurality of nipples are formed in an end wall of the liner and extend through mating apertures in the housing. Two of the nipples extend inwardly into the interior of the housing to provide electrical insulation for the heater leads and also to form a seat for a second heating element which is also composed of semiconductive material having a steeply sloped positive temperature coefficient of resistance above an anomaly temperature of 120° C. The second heater is generally cylindrical and is formed with an axially extending bore in which are received two thermocouple reference junctions. The reference junctions are embedded in brass heat sinks to maximize their response and the heat sinks are potted securely in the bore by means of thermally conductive material. The thermocouple leads are wound around the inner heating element to minimize heat losses along the leads. The housing is received in a cup-shaped member and locked therein by a lock washer. The two heating elements are electrically connected in parallel with the heater and thermocouple leads threaded through the nipples and attached to terminal posts provided in a flange attached to the cup-shaped member.

PATENTED JAN 4 1972

INVENTOR
MARTIN H. DAPOT

BY *John C. Hang*

ATTORNEY

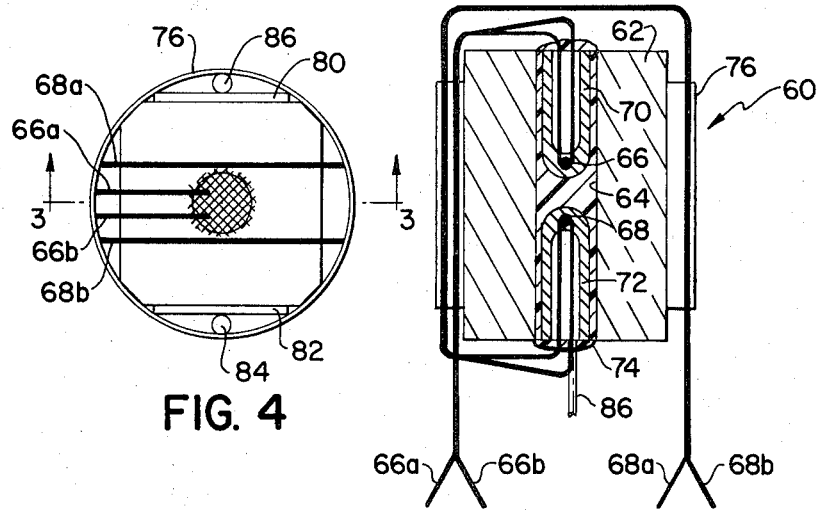
FIG. 4
FIG. 3
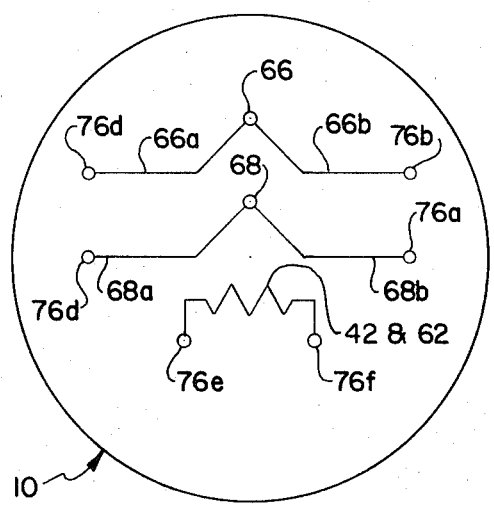
FIG. 5
INVENTOR
MARTIN H. DAPOT

APPARATUS FOR MAINTAINING THERMOCOUPLE REFERENCE JUNCTIONS AT A CONSTANT TEMPERATURE

This invention relates to apparatus for providing a virtually constant temperature for thermocouple reference junctions.

The use of thermocouples as sensors in temperature-measuring systems is well known. Such use requires that the thermocouple reference junction be maintained at a known temperature. The classical laboratory method employs a reference junction immersed in a bath of melting ice. Even though this has the advantage of being very simple and has a high degree of accuracy, it is obvious that it is cumbersome, inconvenient and, in fact, cannot be used for many applications. Other means have been employed sacrificing to some extent accuracy in favor of convenience and flexibility. One way utilized in the prior art is to provide some type of proportioning control with a conventional oven, and another way is to allow the reference junction to vary in temperature with the resultant change in output voltage compensated electronically to simulate a constant temperature reference. This has the disadvantage of being an indirect solution to the problem and therefore less reliable as well as being considerably more expensive.

It is an object of the invention to provide means for directly controlling the temperature of thermocouple junctions while avoiding the cumbersome nature of the laboratory method, yet attaining nearly the same degree of accuracy. Another object of the invention is the provision of thermocouple temperature control in a small, lightweight package, having high reliability and performance characteristics. Another object of the invention is the provision of a device which provides a single reference or temperature control for a double thermocouple junction. Still another object is the provision of such a device which is of low cost, is portable, yet is not subject to ambient sensitivity problems.

Essentially, the apparatus according to the invention comprises a double-oven type of construction. The thermocouple junctions are embedded in a heater element constructed of material having a steeply sloped positive temperature coefficient (PTC) of resistance above an anomaly temperature. This inner element assembly in turn operates in the temperature control enclosure established by an outer heating element also composed of material having a steeply sloped positive temperature coefficient (PTC) of resistance above an anomaly temperature lower than the anomaly temperature of the inner heating element. The double oven assembly is mounted in an electrically and thermally insulating case on which the external terminal connections are mounted. In U.S. Pat. No. 3,414,704, issued Dec. 3, 1968, FIGS. 3 and 4 show the use of a PTC element to maintain a thermocouple junction at a relatively constant predetermined temperature, see FIGS. 3 and 4. Operation of a thermocouple reference junction device has been improved to a great degree using the double-oven approach as suggested in coassigned application Ser. No. 692,004, filed Dec. 20, 1967. One of the problems encountered has been that the operation has been affected by thermal resistance between the heating element and the thermocouple bead. In accordance with the present invention, insertion of the thermocouple junctions into heat-sinking elements 70 and 72 minimizes the thermal resistance between PTC element 62 and beads 66, 68 and produces improved performance and a highly stabilized reference junction temperature.

The invention accordingly comprises the elements and combinations of elements, features of construction and manipulation and arrangement of parts, all of which will be exemplified in the structure hereinafter described, and the scope of the application of which will be indicated in the appended claims.

In the accompanying drawings in which one of the various possible embodiments is illustrated:

FIG. 3 is a cross section of the inner heating element taken on lines 3—3 of FIG. 4;

FIG. 4 is a top view of the inner heating element shown in FIG. 3; and

FIG. 5 is a schematic circuit diagram of a device made in accordance with the invention.

Similar reference characters indicate corresponding parts throughout the views of the drawings.

Figure 1:
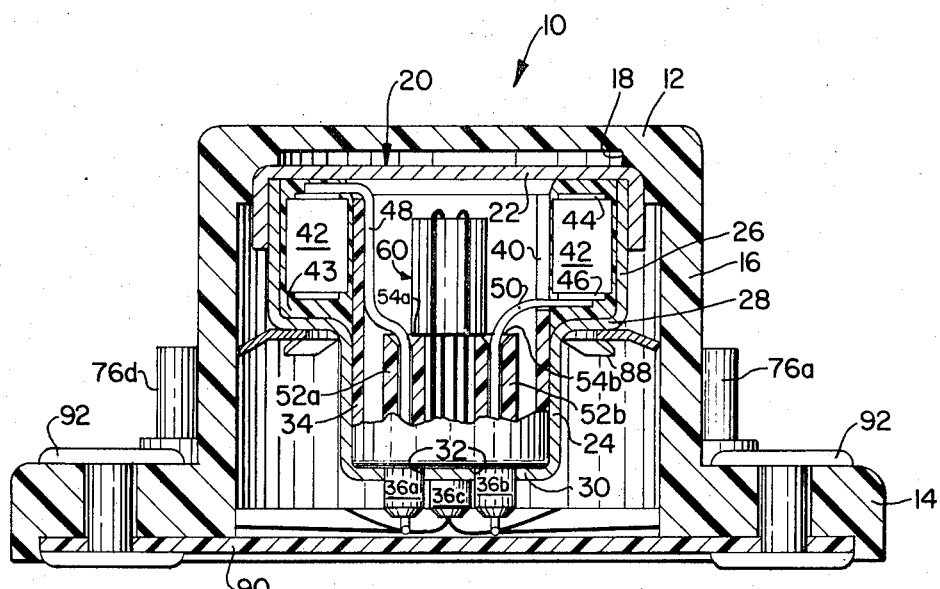
FIG. 1 is a cross section of a front elevation of a device made in accordance with the invention.
Figure 2:
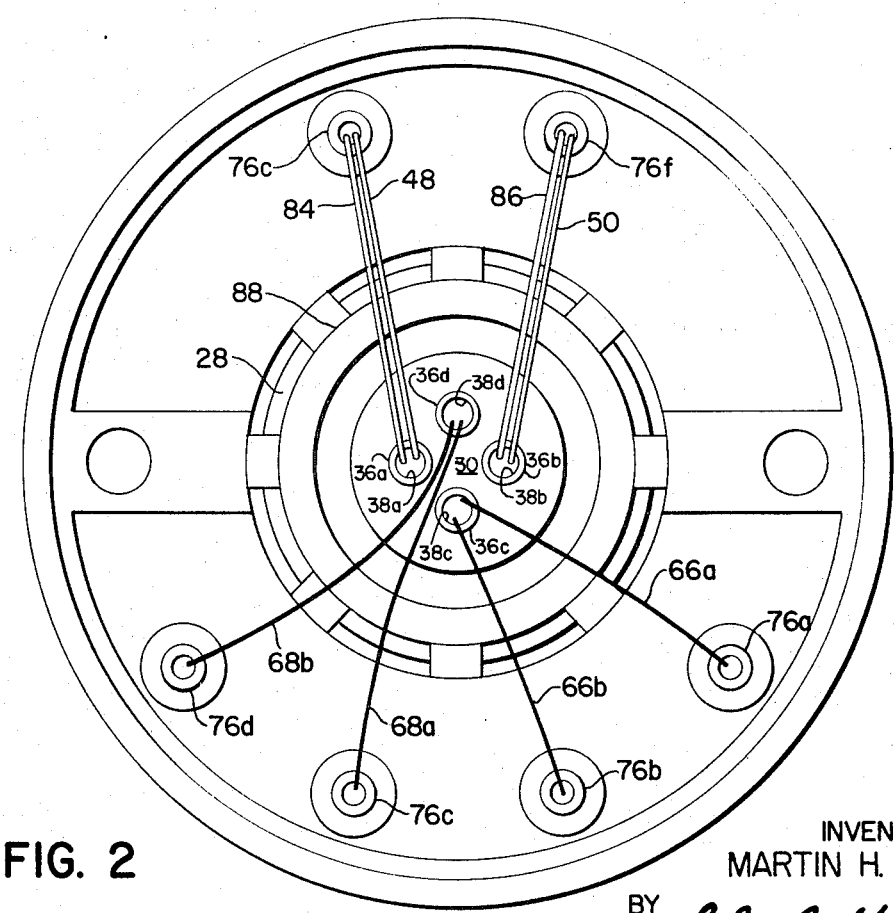
FIG. 2 is a bottom view of the device shown in FIG. 1 with the bottom cover removed.

Dimensions of certain of the parts as shown in the drawings may have been modified or exaggerated for the purposes of clarity of illustration.

Numeral 10 indicates a thermocouple reference device made in accordance with the invention and comprises a generally cup-shaped housing 12 formed with a radially extending flange 14 extending from the distal free end portion of sidewalls 16. A plurality of seating portions 18 are provided in the closed end of housing 12 and receive thereon assembly 20 comprising cover member 22 formed of a material having good heat-conductive characteristics and a mating shell 24 also formed of material, such as copper, having good heat-conductive characteristics. Shell 24 is generally cylindrical in shape having a first diameter portion with closed end 30 and a second enlarged diameter portion 26 joined by radially extending wall portion 28. A lock washer 88 is placed against wall portion 28 to securely lock assembly 20 in housing 12. Bottom wall 30 is provided with a plurality of apertures 32, the purpose of which will be explained below. A liner of electrically insulating material 34 fits closely into the smaller diameter portion of shell 24 and is provided with a plurality of nipples 36 which are inserted through apertures 32 in bottom wall 30. To permit passage of electrical leads therethrough, liner 34 is also provided with an axially extending slot 40 as will be explained below. An annular heating element composed of semiconductive ceramic material having a steeply sloped positive temperature coefficient of resistance (PTC) is received in the enlarged portion of shell 24. On opposite faces of element 42, electrical contact layers 44, 46 respectively are attached by electroless nickel plating, firing, ultrasonic soldering, flame spraying or the like. Lead 48 is attached to layer 44 in a conventional manner as by soldering and lead 50 is attached in similar manner to layer 46. Lead 50 is inserted through slot 40 formed in liner 34 and is threaded through bore 38b of nipple 36b and inwardly extending extension thereof 52b. Element 42 is fixed in place by potting material 43. In like manner, lead 48 passes through bore 38a of a second nipple 36a. Assembly 60 is received on end portions 54a and 54b of inwardly extending portions 52a, 52b respectively. Nipples 36c and 36d are not provided with inwardly extending portions since the leads passing therethrough are already insulated with a suitable coating, for instance, polytetrafluorethylene.

Assembly 60 comprises a generally cylindrical mass 62 of semiconductive ceramic material having a steeply sloped positive temperature coefficient (PTC) of resistance and an anomaly point higher than the anomaly point of element 42. A bore 64 is provided in mass 62 and inserted therein are thermocouple beads or junctions 66,68. Beads 66,68 are entrapped in heat sinks 70,72 respectively formed of good heat-conductive material such as brass. The heat sink members are chosen as large as can be accommodated in bore 64 to minimize the thermal resistance between element 62 and beads 66,68. A good heat-conductive electrically insulating epoxy material locks bodies 70,72 in epoxy material 74. Leads 66a and 66b extend from thermocouple bead 66 and are trained along the length of mass 62. Leads 68a and 68b from thermocouple 68 are trained around mass 62 in close heat-conductive relation thereto. As mentioned above, these leads are provided with a thin electrically insulative coating. This insulation is brought as close as possible to beads 66,68. Sleeve 76 of a heat shrinkable material such as Mylar is placed over the assembly and then is shrunk to securely maintain leads 66a, 66b, 68a and 68b in place. In FIG. 3 the sleeve is shown prior to the shrinking step while FIG. 4 shows the sleeve after it is shrunk tightly against mass 62. Thermocouple beads 66,68 are actually embedded in the closed end body portions of tubular members 70,72 respectively to enhance heat flow from PTC mass 62 to the thermocouples. As mentioned supra, it is very important to keep the thermal resistance between the PTC element and the junction to an absolute minimum to avoid a temperature drop which would vary with ambient changes thereby causing the reference junction to respond to a temperature slightly different than the PTC operating temperature. It is also found that the use of smaller diameter lead wires, for instance, from 0.00315 inch to 0.005 inch in diameter increases the thermal resistance from the junction to the ambient, minimizing heat flow along the wire and improving performance. Leads 66a, 66b, 68a and 68b are attached respectively to terminal post 78a, 78b, 78c and 78d.

Conductive layers 80,82 are attached to spaced locations of mass 62 and leads 84,86 are soldered to layers 82,80 respectively. Leads 50 from element 42 and 86 from element 62 pass through nipple 36b and are attached to a terminal post 76f. Leads 48 and 84 pass through nipple 36a and are attached to a terminal post 76e. Cover 90 encloses the cup-shaped housing 12 and is attached by conventional means such as eyelets 92.

The oven maintains the reference junction at a nominal temperature of 121° C. plus or minus 2° C. varies less than 0.5° C. for each unit over a minimum 10° to 60° C. range. The thermal gain of the device, which is defined as the delta ambient temperature divided by delta control temperature, is equal to 100 minimum at constant voltage.

The use of two reference junctions permit remote location and long runs of relatively inexpensive copper wire to the output detection point in contradistinction to a single junction which would require output leads of relatively expensive thermocouple material.

The material used for two PTC heating elements can be composed of a doped barium titanate as set forth in the copending, coassigned applications referenced supra.

Thus it will be seen that the apparatus made in accordance with the invention provides an accurate, low-cost temperature control for reference junctions of a thermocouple measuring system. The apparatus is useful over for a wide range of temperatures while being an extremely small, lightweight package. Neither the separate heater in proportioning control of conventional ovens nor the discrete sensors and resistors of a bridge compensator are required. Thus, reliability and performance are improved since compensating errors are eliminated. The device provides an accurate reference for a single thermocouple measuring point. The double reference junction allows the use of ordinary copper wire in the measuring circuit and permits location of the oven conveniently near the temperature being measured. The invention solves portability and space problems inherent in the use of modular ovens and laboratory ice baths as well as ambient sensitivity problems associated with nonlinear bridge networks.

In view of the above, it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

I claim:

1. Apparatus for maintaining a thermocouple reference junction at a predetermined temperature comprising a surface maintained at a predetermined temperature, the surface defining a bore, a tubular heat sink member comprising a closed end body portion, the remainder of the tubular member forming a sidewall depending from the body portion, the member telescopically received in the bore in close thermal connection with the surface and a thermocouple junction embedded in the body portion of the heat sink.

2. Apparatus according to claim 1 in which the heat sink member is fixed within the bore with electrically insulating thermally conductive material.

3. Apparatus according to claim 1 in which the bore has two open ends and two thermocouple reference junctions with associated heat sink members and attached leads are received in the bore, the leads from respective junctions extending out opposite ends of the bore.

4. Apparatus for maintaining a thermocouple reference junction at a predetermined temperature comprising a heating element composed of material having a steeply sloped positive temperature coefficient of resistance above an anomaly temperature, the element provided with a bore therein and a thermocouple reference junction with attached leads received in the bore, the leads wrapped around the outer surface of the element to minimize heat flow through the leads.

5. Apparatus according to claim 4 including a sleeve receiving the element and securely holding the leads against the element.

6. Apparatus according to claim 4 including means to maintain a controlled temperature ambient into which the element is placed.

7. Apparatus according to claim 6 in which the means to maintain a controlled temperature ambient includes a cylindrical housing formed of thermally conductive material and formed with first and second diameter portions and having a closed end, an annular heating element formed of material having a steeply sloped positive temperature coefficient of resistance above an anomaly temperature seated in the first diameter portion, a cylindrical liner of electrically insulating material having a closed end received in the second diameter portion of the housing, a plurality of nipples extending from the closed end of the liner and passing through mating apertures in the closed end of the housing and the thermocouple leads threaded through a nipple.

8. Apparatus according to claim 4 in which the anomaly temperature of the element is approximately 120° C.

9. Apparatus according to claim 7 in which the anomaly temperature of the annular heating element is approximately 95° C.

10 Apparatus according to claim 7 further including a cup-shaped base, the thermally conductive housing seated in the cup-shaped base and a lock washer received around the second diameter portion of the housing and locking it in the base.

11. Apparatus according to claim 7 in which two of the nipples extend inwardly into the housing and form a seat for the heating element.

12. Apparatus according to claim 7 in which the heating element and the annular heating element are electrically connected in parallel.

13. Apparatus according to claim 4 in which the bore extends through the element and two thermocouple reference junctions with attached leads are received in the bore, the leads from respective junctions extending out opposite ends of the bore.

14. Apparatus for maintaining thermocouple reference junctions at a predetermined temperature comprising a generally cup-shaped base having a closed end and an outwardly extending radial flange depending from the base, seat portions located in the closed end portion of the base, a generally cylindrical housing having first and second diameter portions and formed of thermally conductive material received on the seat portions, means retaining the housing in the base, a first PTC heater element located in the first diameter housing portion, a cylindrically shaped electrically insulating liner having a closed end with a plurality of nipples extending from the closed end, the liner received in the second diameter housing portion and extending into the first diameter housing portion, the nipples extending through mating apertures in the closed end of the housing, two nipples extending inwardly into the housing and forming a seat, a second PTC heating element mounted in the seat formed by the two inwardly extending nipples with the bore of the second heating element approximately parallel to the axial direction of the nipples, a bore extending through the second PTC heating element, two cylindrical heat sinks having a closed end received in the bore, a thermocouple reference junction embedded in the closed end of each heat sink, thermocouple leads attached to respective junctions extending outwardly from opposite ends of the bore, the thermocouple leads nearest the seat trained around the second heating element and in contact therewith along its length in two directions and threaded through a nipple, the thermocouple leads furthest from the seat trained around the second heating element and in contact therewith along its length in one direction and threaded through a second nipple, first and second heater leads attached respectively to the first and second heater elements and threaded through a third nipple, third and fourth heater leads attached respectively to the first and second heater elements at locations spaced from the first and second leads and threaded through a fourth nipple, contact posts mounted on the radial flange of the base, the leads attached to terminal posts to provide appropriate electrical connections and a cover enclosing the base and attached to the radial flange.

* * * * *